United States Patent Office 3,657,435
Patented Apr. 18, 1972

3,657,435
17β-HYDROXY - 17 - ETHYNYL-4-ANDROSTENO-
[3,2-c] - 2'-(p-FLUOROPHENYL)PYRAZOLE AND
COMPOSITIONS CONTAINING SAME
Frederik W. Stonner, Chatham, N.Y., assignor to
Sterling Drug Inc., New York, N.Y.
No Drawing. Continuation-in-part of application Ser. No.
659,292, Aug. 9, 1967. This application Dec. 4, 1969,
Ser. No. 882,307
Int. Cl. C07c 173/00
U.S. Cl. 424—241
3 Claims

ABSTRACT OF THE DISCLOSURE

17β-hydroxy - 17 - ethynyl-4-androsteno[3,2-c]-2'-(p-fluorophenyl)pyrazole, prepared from 2-hydroxymethylene-17β-hydroxy - 17 - ethynyl - 4 - androsten-3-one and p-fluorophenylhydrazine, is a useful anti-inflammatory agent, especially for topical application in an ointment or cream base.

This application is a continuation-in-part of my copending application, Ser. No. 659,292, filed Aug. 9, 1967, now U.S. Pat. 3,539,556, issued Nov. 10, 1970.

This invention relates to the novel compound 17β-hydroxy-17-ethynyl - 4 - androsteno[3,2-c]-2'-(p-fluorophenyl))pyrazole, to compositions containing the same for topically treating inflammatory conditions, and to a method for treating inflammatory conditions with said compositions.

17β-hydroxy - 17 - ethynyl-4-androsteno[3,2-c]-2'-(p-fluorophenyl)pyrazole having the formula

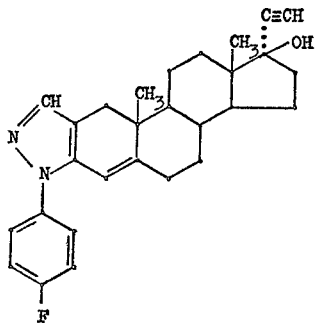

can be prepared according to the following procedure:

To a solution of 2.46 g. of sodium acetate in 4 ml. of water was added 4.31 g. of p-fluorophenylhydrazine hydrochloride and 80 ml. of glacial acetic acid. The mixture was stirred for 15 minutes and 10 g. of 2-hydroxymethylene-17α-ethynyl-4-androstan - 17β - ol-3-one (M.P. 175–183° C., U.S. Pat. 3,135,743) was added. The reaction mixture was heated on a steam bath for 90 minutes and then poured into 800 ml. of water with stirring. The mixture was allowed to stand for three days, and the product was collected by filtration, washed with water and air-dried. The resulting 12.1 g. of product was dissolved in ether, the solution decolorized with activated charcoal and pentane added to the boiling solution. Upon cooling, the product crystallized and it was recrystallized repeatedly from the same solvent mixture to give 5.9 g. of 17β-hydroxy - 17 - ethynyl - 4 - androsteno[3,2-c]-2'-(p-fluorophenyl)pyrazole, M.P. 204–206° C., after softening at 116° C.; $[\alpha]_D^{25} = +49.5°$ (1% in chloroform).

Adrenalectomized male rats were medicated orally with 17β - hydroxy - 17 - ethynyl-4-androsteno[3,2-c]-2'-(p-fluorophenyl)pyrazole for five days. The results showed that this compound was six times more active than prednisone in terms of glycogen deposition and involution of the thymus. The glycogenic response of a single medication of 17β-hydroxy-17-ethynyl - 4 - androsteno[3,2-c]-2'-(p-fluorophenyl)pyrazole persisted for twenty-four hours in contrast to prednisone or 6α-methylprednisolone which have little or no glycogenic activity twenty-four hours following medication.

17β - hydroxy - 17 - ethynyl-4-androsteno[3,2-c]-2'-(p-fluorophenyl)pyrazole is 2 times more glycogenic and 2.4 times more thymolytic orally than subcutaneously. This is in contrast to results obtained with prednisolone which is 0.17 times as glycogenic and 0.24 times as thymolytic orally as compared with subcutaneous administration. The longer duration of action and higher oral activity of 17β-hydroxy-17-ethynyl-4-androsteno[3,2-c]-2'-(p-fluorophenyl)pyrazole as compared with standard cortical hormones means that less frequent medication is necessary with less likelihood of appearance of side-effects.

17β - hydroxy - 17 - ethynyl - 4 - androsteno[3,2-c]-2'-(p-fluorophenyl)pyrazole produced kaluresis at a dose about one-third to equal its minimal thymolytic and glycogenic dose in contrast to prednisone and 6α-methyl-prednisolone which were kaluretic at one-tenth their minimal thymolytic and glycogenic doses.

17β-hydroxy-17-ethynyl-4-androsteno[3,2-c]-2'-(p - fluorophenyl)pyrazole was assessed for anti-inflammatory activity against carrageenan edema, Winter et al., Soc. Exptl. Biol. Med. 111, 544 (1962), and cotton granuloma formation, Winter et al., J. Am. Pharm. Assoc., Sci. Ed. 46, 515 (1957), in rats. It was found that a dose of 9 mg./kg. caused a 30% carrageenan edema inhibitory response, and orally it is as effective as prednisone. In the cotton granuloma test, when the steroid was placed directly on the cotton pellet, 17β-hydroxy-17-ethynyl-4-androsteno[3,2-c] - 2' - (p-fluorophenyl)pyrazole was 82 times more effective than prednisone and 0.7 times as effective as dexamethasone in locally inhibiting granuloma tissue formation.

17β - hydroxy - 17 - ethynyl - 4 - androsteno[3,2-c]-2'-(p-fluorophenyl)pyrazole was also active against E. coli endotoxic induced lung inflammation in mice and croton oil granuloma pouch formation in rats.

Oral doses of 17β-hydroxy-17-ethynyl-4-androsteno-[3,2-c]-2'-(p-fluorophenyl)pyrazole up to 1000 and 1250 mg./kg. in dogs and rabbits were well tolerated. No gross tissue changes were observed in the dogs receiving the 1000 mg./kg. dose. Rhesus monkeys were given daily oral doses of 17β-hydroxy - 17 - ethynyl-4-androsteno-[3,2-c]-2'-(p-fluorophenyl)pyrazole up to 43.2 mg./kg. for three months, and the compound was well tolerated without any tissue or organ changes noted except an expected decrease in the size of the adrenals.

Pharmaceutical formulations containing 17β-hydroxy-17-ethynyl - 4 - androsteno[3,2-c]-2'-(p-fluorophenyl)pyrazole were prepared as follows:

Capsules for oral administration: 2 parts by weight of the steroid was milled to an average particle size of 5.2 microns and mixed with 119 parts of lactose and 119 parts of starch. Capsules were filled with the mixture, each capsule containing 240 mg. of the mixture (2 mg. of steroid). Similarly were prepared capsules containing 5.0 mg. of steroid (117.5 mg. of lactose and 117.5 mg. of starch) and 25.0 mg. of steroid (107.5 mg. of lactose and 107.5 mg. of starch).

Formulations for topical applications are prepared in a pharmaceutically acceptable ointment or cream base; for example, 2.5 g. of steroid was mixed with 100.0 g. of macrogol base. Similar ointments were prepared using 1.0 g. and 0.1 g. of steroid per 100.0 g. of macrogol base. Further ointments were prepared by mixing 0.1 g. of the steroid with 100g. of white petrolatum.

The concentration of 17β-hydroxy-17-ethynyl-4-androsteno[3,2-c]-2'-(p-fluorophenyl)pyrazole in formulations for topical application may vary between about 0.1 percent and 10 percent by weight. Typical 1% formulations are as follows ("steroid" refers to 17β-hydroxy-17-ethynyl-4-androsteno[3,2-c]-2'-(p-fluorophenyl)pyrazole).

(1) Vanishing cream formula

|  | Grams |
|---|---|
| Steroid | 10.0 |
| Cetyl alcohol | 27.0 |
| Stearyl alcohol | 90.0 |
| Spermaceti | 90.0 |
| Propylparaben | 0.3 |
| Methylparaben | 2.7 |
| Sodium lauryl sulfate | 10.0 |
| Sodium phosphate, dibasic·7H$_2$O | 7.5 |
| Citric acid·H$_2$O | 3.2 |
| Glycerol | 116.0 |
| Distilled water | 643.3 |
| Total wt. | 1000.0 |

(2) Macrogol base formula

|  | Grams |
|---|---|
| Steroid | 10.0 |
| Polyethylene glycol 400 | 693.0 |
| Polyethylne glycol 4000 | 297.0 |
| Total wt. | 1000.0 |

Formulations containing 0.1 to 10% (1 gram to 100 grams per kilogram of total weight) of steroid can be prepared in the same way.

17β - hydroxy - 17 - ethynyl-4-androsteno[3,2-c]-2'-(p-fluorophenyl)pyrazole was compared with hydrocortisone at concentrates of 1.0, 2.5 and 6.0% in a vanishing cream base for topical antiphlogistic-thymolytic effects, as measured by the inhibtion of the increase in rat-ear weights caused by the phlogistic effect of croton oil, and by the decrease in thymus weights of the rats. The data from two replicate assays indicated that 17β-hydroxy-17-ethynyl - 4-androsteno[3,2-c]-2'-(p-fluorophenyl)pyrazole and hydrocortisone are antiphlogistic in proportion to their concentration in the formulation tested. No thymolytic effects were observed with 17β-hydroxy-17-ethynyl-4-androsteno[3,2-c]-2'-(p-fluorophenyl)pyrazole at any of the concentrations tested while hydrocortisone significantly suppressed thymus weights at the 6% concentration level. 17β-hydroxy-17-ethynyl-4-androsteno[3,2-c]-2'-(p-fluorophenyl)pyrazole is therefore equally effective as a topical antiphlogistic agent with less systemic thymolytic effects than hydrocortisone.

17β - hydroxy - 17 - ethynyl-4-androsteno[3,2-c]-2'-(p-fluorophenyl)pyrazole, 1% in either vanishing cream or macrogol base, was well tolerated by albino rabbits in terms of effects upon the skin when applied topically seven hours per day, five days per week for three months. The only change observed consisted of mild erythema of the skin with the vanishing cream formulation, and since the same change was observed with the vanishing cream alone, the erythema observed was not attributable to the presence of the steroid in the formulation.

Single oral doses of two formulations of 1% 17β-hydroxy - 17-ethynyl-4-androsteno[3,2-c]-2'-(p-fluorophenyl)pyrazole, one in a vanishing cream base and the other in a macrogol base, were given to rhesus monkeys to study acute oral tolerance. Doses of 1.0, 4.0 and 16.0 ml./kg. were tolerated and no overt pharmacologic effects were observed. Growth rate was nominal and no drug-induced changes were observed in the heart or respiratory rates of the monkeys receiving the highest dose or in the tissues of these monkeys when examined grossly at autopsy.

I claim:

1. 17β - hydroxy-17-ethynyl-4-androsteno[3,2-c]-2'-(p-fluorophenyl)pyrazole.

2. A composition for topical application for treating inflammatory conditions in mammals comprising from 0.1 to 10% of the compound according to claim 1 in a pharmaceutically acceptable ointment or cream base.

3. A method for treating inflammatory conditions in mammals which comprises applying topically to said mammals a composition according to claim 2.

References Cited

UNITED STATES PATENTS 3,539,556   11/1970   Stonner _____ 260—239.5

ELBERT L. ROBERTS, Primary Examiner

U.S. Cl. X.R.

260—239.5

Dedication 3,657,435.—*Frederik W. Stonner*, Chatham, N.Y. 17β-HYDROXY-17-ETHYNYL-4-ANDROSTENO-[3,2-c]-2'-(p-FLUOROPHENYL)PYRAZOLE AND COMPOSITIONS CONTAINING SAME. Patent dated Apr. 18, 1972. Disclaimer filed Aug. 5, 1971, by the assignee, *Sterling Drug Inc.*

Hereby disclaims the portion of the term of the patent subsequent to Nov. 10, 1987.

[*Official Gazette March 13, 1973.*]